United States Patent
da Silva et al.

(10) Patent No.: US 9,984,109 B2
(45) Date of Patent: May 29, 2018

(54) EVOLUTION AWARE CLUSTERING OF STREAMING GRAPHS

(71) Applicant: INTERNATIONAL BUSINESS MACHINES CORPORATION, Armonk, NY (US)

(72) Inventors: Gabriela Jacques da Silva, Brooklyn, NY (US); Kun-Lung Wu, Yorktown Heights, NY (US); Mindi Yuan, Urbana, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 759 days.

(21) Appl. No.: 14/219,373

(22) Filed: Mar. 19, 2014

(65) Prior Publication Data

US 2015/0269211 A1 Sep. 24, 2015

(51) Int. Cl.
*G06F 17/30* (2006.01)

(52) U.S. Cl.
CPC .. *G06F 17/30353* (2013.01); *G06F 17/30598* (2013.01)

(58) Field of Classification Search
CPC ......... G06F 17/30064; G06F 17/30091; G06F 17/30289; G06F 17/30598; G06F 17/30353
USPC .......................................................... 707/725
See application file for complete search history.

(56) References Cited

U.S. PATENT DOCUMENTS

| | | | |
|---|---|---|---|
| 6,028,608 A | 2/2000 | Jenkins | |
| 7,768,524 B2 | 8/2010 | Snyder et al. | |
| 8,139,843 B2* | 3/2012 | Kulkarni | G06F 17/5045 382/144 |
| 8,392,381 B2* | 3/2013 | Al-Kateb | G01D 21/00 707/688 |
| 2007/0057945 A1* | 3/2007 | Olson | G06T 17/10 345/424 |
| 2011/0004863 A1* | 1/2011 | Feblowitz | G08G 1/04 717/105 |
| 2011/0029571 A1* | 2/2011 | Aggarwal | G06F 17/30958 707/798 |
| 2012/0131530 A1* | 5/2012 | Moffitt | G06F 17/5027 716/113 |
| 2012/0311581 A1 | 12/2012 | Balmin et al. | |
| 2013/0013549 A1* | 1/2013 | Chang | G06Q 10/00 706/48 |

(Continued)

OTHER PUBLICATIONS

Eldawy et al., "Clustering Streaming Graphs," Distributed Computing Systems (ICDCS), 2012 IEEE 32nd International Conference on.

(Continued)

*Primary Examiner* — Mark E Hershley
(74) *Attorney, Agent, or Firm* — F. Chau & Associates, LLC (57) ABSTRACT

A system to manage clustering vertices of a streaming graph includes a memory storing a computer program, a vertex structure storing vertices of the graph, and a cluster structure storing clusters of the graph, and a processor. Each cluster structure comprises a plurality of edge structures represent edges of the graph and each edge structure comprises two of the vertices. The processor is configured to execute the program to cluster the vertices using the structures and a maximum cluster size that is constant.

12 Claims, 6 Drawing Sheets

(56) References Cited

U.S. PATENT DOCUMENTS

| | | | | |
|---|---|---|---|---|
| 2013/0339357 | A1* | 12/2013 | Eldawy | G06F 17/30961 707/737 |
| 2014/0143347 | A1* | 5/2014 | Murarka | H04L 51/32 709/206 |
| 2015/0161228 | A1* | 6/2015 | Davies | G06F 17/30958 707/737 |
| 2015/0261886 | A1* | 9/2015 | Wu | G06F 17/30958 707/798 |

OTHER PUBLICATIONS

Smith et al., "Application of adaptive cluster sampling to low-density populations of freshwater mussels," Environmental and Ecological Statistics 10, 7-15, 2003.

Gedik et al., "ASAP: An Adaptive Sampling Approach to Data Collection in Sensor Networks," IEEE Transactions on Parallel and Distributed Systems, vol. 18, No. 12, Dec. 2007.

Zhang, "A Survey on Streaming Algorithms for Massive Graphs," Managing and Mining Graph Data Advances in Database Systems vol. 40, 2010, pp. 393-420.

Al-Kateb et al., "Adaptive-size reservoir sampling over data streams." Scientific and Statistical Database Management, 2007. SSBDM'07. 19th International Conference on. IEEE, 2007.

Nam P. Nguyen et al., "Adaptive Algorithms for Detecting Community Structure in Dynamic Social Networks", presented as part of the main technical program at IEEE INFOCOM 2011; pp. 2282-2290.

Aggarwal et al., "A Framework for Clustering Evolving Data Streams", Proceedings of the 29th VLDB Conference, Berlin, Germany, 2003.

Albert Angel et al., "Dense Subgraph Maintenance under Streaming Edge Weight Updates for Real-time Story Identification", Aug. 27-31, 2012, Istanbul, Turkey, Proceedings of the VLDB Endowment, vol. 5, No. 6, pp. 574-585.

Yu-Ru Lin et al., "FacetNet:A Framework for Analyzing Communities and Their Evolutions in Dynamic Networks", WWW 2008, Apr. 21-25, 2008, Beijing, China, pp. 685-694.

Stanton et al., "Streaming Graph Partitioning for Large Distributed Graphs", KDD'12, Aug. 12-16, 2012, Beijing, Chinaf.

"Grace Period Disclosure" Mindi Yuan, Kun-Lung Wu, Garbiela Jacques-Silva, Yi Lu, "Efficient Processing of Streaming Graphs for Evolution-Aware Clustering", CIKM '13, Oct. 27-Nov. 1, 2013, San Francisco, CA.

Charu C. Aggarwal, et al., "On Clustering Graph Sreams", Proceedings of the 2010 SIAM International Conference on Data Mining, Apr. 29-May 1, 2010; pp. 478-489.

Pavlos S. Efraimidis, "Weighted Random Sampling over Data Streams", CoRR (2010).

* cited by examiner

Vertex Table 501

| VertexID | ClusterID |
|---|---|
| 77 | 12 |
| 11 | 11 |

Insertion ⇄ Deletion

Cluster Table 502

| ClusterID | Size | Edges: <v1, v2, time> |
|---|---|---|
| 11 | 243 | <11,13,1>,<11,14,2>... |
| 12 | 67 | <77,12,3>... |

FIG. 5

| Insertion of an edge |
|---|
| if both endpoints of the edge are new then<br>    insert them to vertexTable;<br>    insert the edge to clusterTable;<br>    increase the size of the cluster by 2;<br>else if only one endpoint of the edge is new then<br>    insert the new endpoint to vertexTable;<br>    insert the edge to the cluster of the old endpoint;<br>    increase the size of the cluster by 1;<br>    if maximum cluster size reached then<br>        delete the oldest edge from the cluster;<br>    end if<br>else<br>    if the two endpoints are in the same cluster then<br>        insert the edge to that cluster;<br>    else<br>        merge the smaller cluster to the bigger one;<br>        if maximum cluster size reached then<br>            delete the oldest edge from the cluster;<br>        end if<br>    end if<br>end if<br>if window is full then<br>    delete the oldest edge;<br>end if |

FIG. 6

| Deletion of an edge |
|---|
| *edgeListCopy* = the edge list of that cluster;<br>*edgeListCopy.pop_front()*;<br>erase the entry in clusterTable;<br>reset the corresponding entries in vertexTable;<br>for each edge in *edgeListCopy* do<br>    insert that edge using the insertion algorithm;<br>end for |

EVOLUTION AWARE CLUSTERING OF STREAMING GRAPHS

GOVERNMENT RIGHTS STATEMENT

This invention was made with Government support under Contract No. W911NF-12-C-0028 awarded by the Defense Advanced Research Projects Agency (DARPA). The Government has certain rights in this invention.

STATEMENT REGARDING PRIOR DISCLOSURES BY THE INVENTOR OR A JOINT INVENTOR

This invention is based on "Efficient Processing of Streaming Graphs for Evolution-Aware Clustering", published on Oct. 27, 2013 by the Conference on Information and Knowledge Management (CIKM 2013), which was authored by Gabriela Jacques da Silva, Kung-Lung Wu, and Mindi Yuan.

BACKGROUND

1. Technical Field

The present disclosure relates to the stream processing, and more particularly to determining clusters from the processed streams.

2. Discussion of Related Art

As the world becomes more interconnected and instrumented, there is a deluge of data coming from various software and hardware sensors in the form of continuous streams. Examples can be found in several domains, such as financial markets, telecommunications, surveillance, manufacturing, healthcare, and social networks. In all of these domains, there is an increasing need to gather, process, and analyze these data streams to extract insights as well as to detect emerging patterns and outliers. More importantly, this analysis often needs to be performed in near real-time.

Streaming data can be represented by using a graph. For example, data that is streamed (output) from a source (e.g., a first user) to a destination (e.g., a second user) can be represented as an edge in the graph, and the source and destination can be respective nodes of the edge. A group of related nodes in the graph may be referred to as a cluster. Further, the clusters may represent particular relationships that can be used for marketing purposes. However, since new data is constantly being input, the graph can become quite complex and it can be difficult to determine the clusters.

Accordingly, there is a need for methods and systems that can more efficiently analyze streaming graphs.

BRIEF SUMMARY

According to an exemplary embodiment of the invention, a system to manage clustering vertices of a streaming graph includes a processor and a memory storing a computer program, a vertex structure storing vertices of the graph, and a cluster structure storing clusters of the graph. Each cluster structure includes a plurality of edge structures that represent edges of the graph and each edge structure includes two of the vertices. The processor is configured to execute the program to cluster the vertices using the structures and a maximum cluster size that is constant.

According to an exemplary embodiment of the invention, a method of clustering vertices of a streaming graph having a plurality of edges includes: predicting whether an incoming edge, if added to the graph, results in a cluster larger than a constant maximum cluster size, adding the incoming edge to the graph, when it is not predicted to result in the cluster larger than the size, and deleting at least one existing edge of the graph and adding the incoming edge to the graph when it is predicted to result in the cluster larger than the size.

According to an exemplary embodiment of the invention, a method for clustering vertices of a streaming graph includes maintaining a graph clustering structure comprising a vertex structure mapping a vertex identifier to a cluster identifier of a corresponding cluster, and a cluster structure for each cluster of the graph, wherein the cluster structure comprises a current cluster size and a plurality of edges in the cluster sorted by a timestamp order of the edges, and inserting an incoming edge to the graph clustering structure.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relates to methods and/or systems that can more efficiently analyze and cluster streaming graphs.

As an example, a streaming graph may include a multitude of nodes (e.g., vertices), where each vertex represents a user (e.g., on Twitter™) and each edge represents a message (e.g., a Tweet™) sent from one user to another user, and the direction of the edge indicates whether the user is sending the message or receiving the message. A subset of related vertices may be referred to as a cluster. For example, if 4 vertices of the graph show connections primarily among themselves, but only loose connections with respect to the other vertices, it is likely that these 4 vertices are part of a cluster.

Clustering of vertices of a graph based on dynamic changes in edge connections is a powerful tool to understand social graphs (e.g., generated from social networks such as Twitter™, Facebook™, LinkedIn™, etc.), e.g., recognizing user communities. In scenarios where entity relationships change over time, a graph clustering algorithm needs to process a stream of updates. Each update can be the insertion or deletion of an edge or a vertex in the graph. For example, if the analysis concludes that a user is not important to a current cluster for understanding the context of that cluster, the vertex can be deleted. Similarly, if the analysis concludes that a particular message from one user to another user within the cluster is redundant or not important, the corresponding edge can be deleted. Clustering of vertices in streaming graphs can be used to find user communities in real-time. For example, one group of users within the graph may be having a discussion about smartphones while another group of users may be having a discussion about parenting. Thus, the ability to determine the clusters and their interests can be useful if a business wants to market a particular product by sending targeted advertisements.

Graph clustering can be performed by partitioning the vertices of a graph into different groups based on edge weights subject to a constraint, which could be either the maximal number of vertices in a cluster or the total number of clusters. For example, vertices can be partitioned into clusters so that the sum weight of the inter-cluster edges (also called weighted cut size) is minimized.

Due to limitations in memory, a streaming application can use a sliding or tumbling window to limit the amount of data for processing. These windows maintain, for example, only the most recent updates of a graph, like the graph consisting of the last 1 million edges. As new updates continue to stream in, old updates are removed from the window.

Even though a sliding window in a stream processing captures some cluster evolution, it alone may not be adequate. This is particularly true if the window size is large and the clustering of the vertices within the window has already changed significantly.

For convenience of describing an embodiment of the invention, an undirected weighted graph G=(V,E) is considered below. Each edge is in the form of $<v_i, v_j, v_{ij}>$, where $v_i$ and $v_j$ are the two endpoints of an edge and $w_{ij}$ is the associated weight. There is also a constraint on the maximum number of vertices in each cluster, i.e., the maximum cluster size (MCS), denoted by M. The vertices V are partitioned into clusters $C_1, C_2, \ldots, C_n$ so that the sum weight of the inter-cluster edges (called weighted cut size) is minimized and $|Cs| \leq M$, $\forall s \in \{1, 2, \ldots, n\}$ is subject to the below Equation 1

$$\min \sum_{C(vi) \neq C(vj)} Wij \quad \text{[Equation 1]}$$

$$\text{s.t. } |Cs| \leq M, \forall s \in \{1, 2, \ldots, n\}$$

$$Cs \cap Ct = \emptyset, \forall s \neq t, s, t \in \{1, 2, \ldots, n\}$$

where C(vi) returns the cluster ID of vertex vi. The constraint limits the MCS and the second constraint requires that each vertex can only participate in one cluster.

To cluster a streaming graph, the above clustering problem (the above optimization problem) is solved whenever the graph in the window changes. This can happen when an edge is added or removed from the graph. As a large volume of graph updates can occur in a short period of time, offline graph clustering is inefficient. As a result, at least one embodiment of the invention makes use of an online incremental algorithm for clustering a streaming graph, which is hereinafter referred to as an evolution-aware clustering (EAC) approach.

In the EAC approach, each connected component is treated as a cluster and these clusters are maintained incrementally upon a graph update. It is assumed that each cluster is constrained by a maximum number of vertices. The time (e.g., a timestamp) at which an edge is received is treated as its weight. The edges in each cluster are kept in a sorted order based on its recency. More recent edges are favored over older ones in cluster merging and splitting, effectively capturing emerging cluster evolution in the streaming graph. The maintenance of recency-ordered edges within a cluster makes the EAC approach incremental and efficient.

Additionally the EAC approach is amenable to a distributed implementation. For example, the maintenance of clusters can be distributed to different computing nodes and it affects at most two computing nodes when merging two clusters.

Unlike one approach where vertices are moved around among clusters and the cut edges are still kept for future clustering decisions, once the EAC approach chooses an edge to be part of the cut due to an MCS constraint violation, the cut edge is no longer considered for future clustering decisions. Because of that, it is as if this cut edge is deleted from the graph. Although similar in practice, this operation is conceptually different from deletion of an edge that occurs when a window slides.

Figure 1:
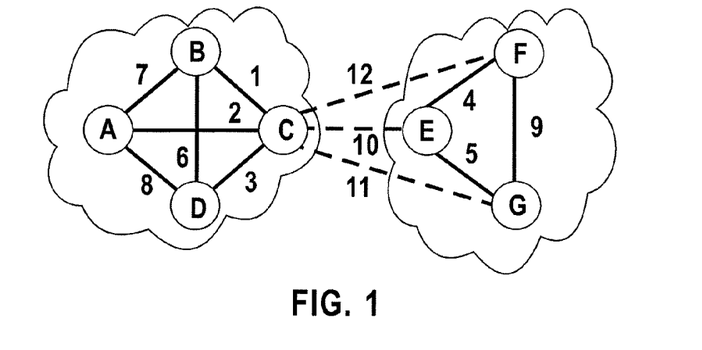
FIG. 1 illustrates an exemplary streaming graph that may be operated on by embodiments of the invention.

FIG. 1 illustrates an example of a streaming graph that will be used below to explain at least one exemplary embodiment of the invention. The graph represents a soccer discussion forum during the 2012 European Championship. The vertices A, B, ..., G represent 7 users engaged in the discussion. It is assumed that vertices A, B and D are fans of the German team, vertex C is a fan of the Italian team, and vertices E, F and G are fans of the Spanish team. Suppose it is June $28^{th}$ when there is a game between Germany and Italy and the winner will enter the final to play Spain. Assume that an edge represents an interaction between two users, such as a conversation or a reply to a message posted on the forum. New edges arrive in the order specified by their label (e.g., edge (B, C) arrives first). The first conversation happens between B and C. They are debating how one team will defeat the other. Then, the edge (A, C) comes in followed by (C, D), and F), when the Spaniards cannot wait to see the final, etc. After that day, the German team lost. As a result, A, B and D might not be as active as before. C, on the contrary, is so excited about her team entering the final and she begins to talk to the Spanish fans. That interaction is represented by edges (C, E), (C, F), and (C,G). Before time 10, there are naturally two separate clusters (see two clouds in FIG. 1). After time 10, C is talking to the members of the right cluster (represented by dotted lines). The fact that C is now talking to entities in the right cluster rather than the ones in the left cluster, as before, is an example of clustering evolution.

Once there is an edge between C and E (e.g., timestamp 10), the two clusters merge together because connected components are used to represent clusters. However, since this would result in only one big cluster of 7 vertices, and the maximum number of vertices in one cluster is 4, in one clustering approach, the edge that just came in is removed. This approach can then be used again for each of the edges with timestamps 11 and 12. Thus, all of the dotted lines of FIG. 1 would be removed. However, such an approach would not adequately capture the evolution of the conversation among A-D to a conversation among C and E-G, since C continues to stay with the left cluster after the 12$^{th}$ edge update. Accordingly, that approach is not able to detect and adapt to the evolution that C is now eager to become part of the cluster containing E, F, and G, rather than the cluster containing A, B, D.

At least one embodiment of the invention (e.g., the EAC approach) would move C to the cluster on the right and allow them to form a new cluster, i.e., splitting the cluster by cutting the edges with timestamps 1, 2, and 3.

Figure 2:
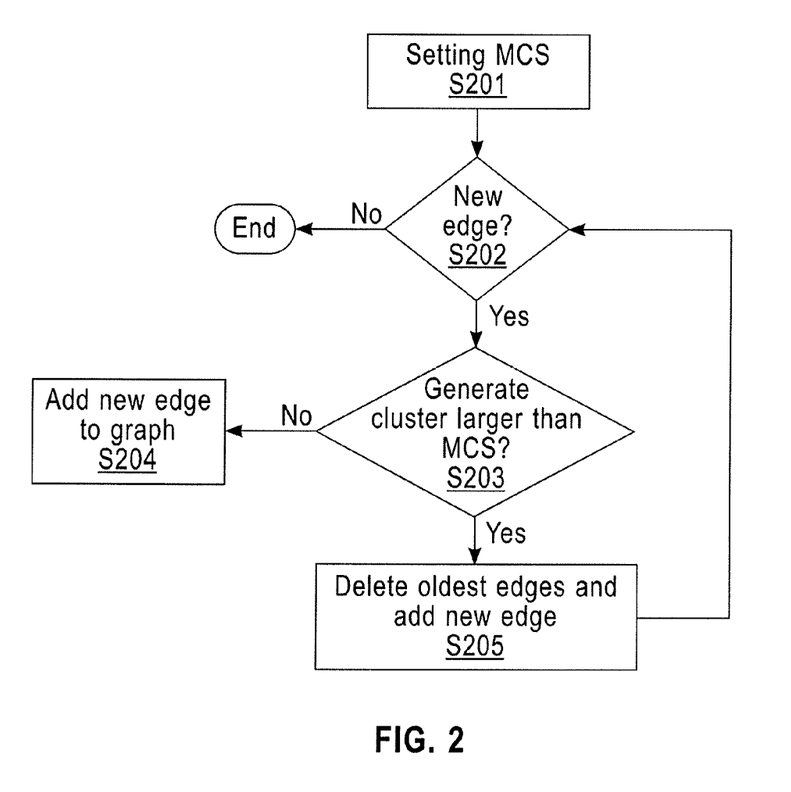
FIG. 2 illustrates a method of clustering a streaming graph according to an exemplary embodiment of the inventive concept.

FIG. 2 illustrates a method of performing clustering according to an exemplary embodiment of the invention, which can be applied to the graph shown in FIG. 1. Referring to FIG. 2, the method includes: setting a maximum cluster size (S201), determining whether there is a new incoming edge (S202), and determining whether adding the new incoming edge to the graph will generate a cluster larger than the maximum cluster size (MCS) (S203). If it is determined that it will not generate the cluster larger than the MCS, the new incoming edge is added to the graph (S204). If it is determined that it will generate a cluster larger than the MCS, then the oldest edges are deleted from the graph and the new edge is added (S205). The method is then repeated for each new incoming edge. The size MCS may vary based on the application.

Figure 3A:
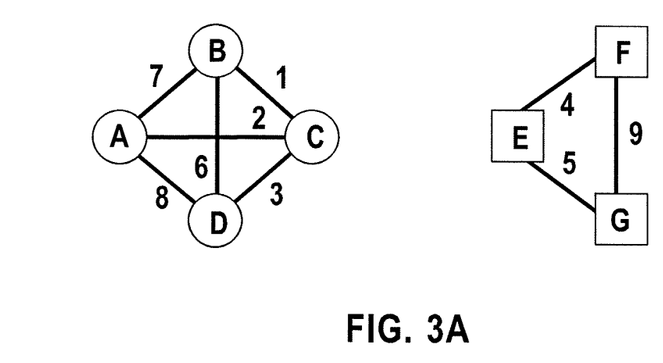
FIG. 3A-3D illustrates the streaming graph being operated on by the method of FIG. 2.
Figure 3B:
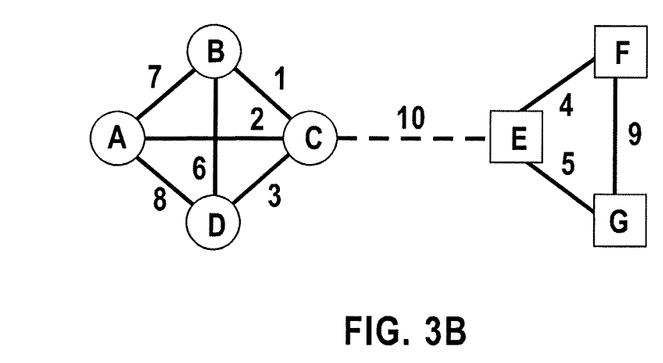
Figure 3C:
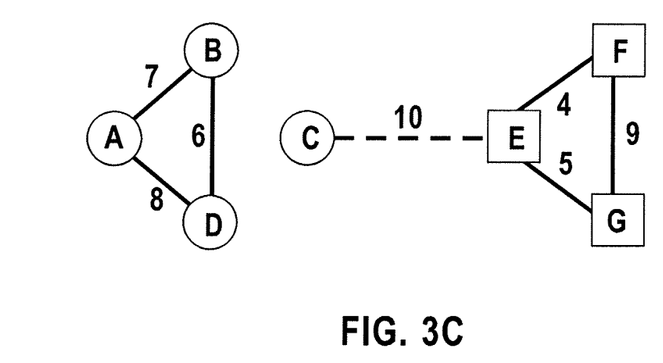
Figure 3D:
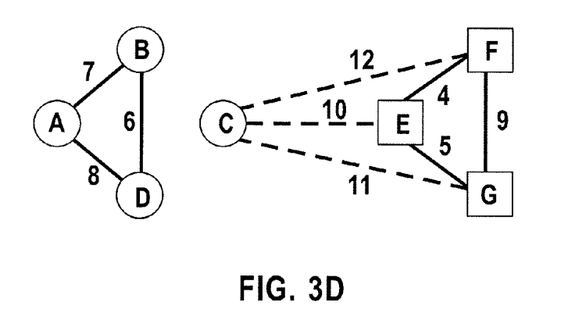

FIG. 3A-3D illustrates the steps that occur when the method of FIG. 2 is applied to the graph of FIG. 1. FIG. 3A illustrates an initial stage, where a left cluster includes A-D and a right cluster includes E-G. FIG. 3B illustrates receipt of a first new incoming edge of timestamp 10 that if connected between vertices C and E would result in a cluster larger than the MCS (e.g., a cluster of 7 assuming MCS=4). FIG. 3C illustrates that since the first new incoming edge would result in a cluster whose size exceeds MCS, the oldest edges (e.g., edges B-C, A-C, D-C) are deleted. This EAC clustering approach puts more weight on a new edge than an old edge. The choice of edges to delete may be based on the edge weight, one edge at a time from the smallest until there is no cluster with size greater than MCS. For example, edge B-C (weight 1) is first removed since it has the smallest edge weight. After removal of edge B-C, the cluster size is still 7, however, since A, B, G are still connected. As a result, edge A-C (weight 2) is removed followed by edge D-C. After that there are two separate clusters (A, B, D) and (C, E, F, G). In this way, the weighted cut size (the total weights of edges connecting across different clusters) actually reflects how well the EAC approach can capture the evolution. FIG. 3D illustrates the addition of a new incoming edge C-G of timestamp 11 and C-F of timestamp 12, which are added because they do not increase the cluster size of a given cluster beyond the MCS.

Figure 4:
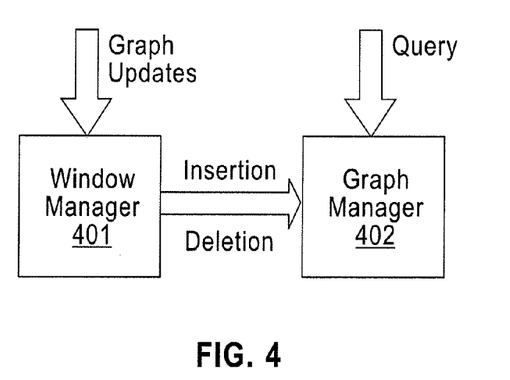
FIG. 4 illustrates an architecture for implementing a method of clustering a streaming graph according to an exemplary embodiment of the inventive concept.

FIG. 4 is an overview of a system architecture according to an exemplary embodiment of the inventive concept. The architecture includes a window manager (WM) (401) and a graph manager (GM) (402). Once a new graph update occurs, it enters the system through the WM 401. The WM 401 then forwards graph insertion and deletion requests to the GM 402. A graph query may go directly to the GM 402, which is responsible for answering the query.

Windowing may be used in a streaming environment to limit the amount of data for processing. For certain analytics, one is interested more about the recent state of the graph, such as the graph interactions occurring within the past 24 hours. In this sense, the streaming window naturally helps to capture some clustering evolution. But, it may not be adequate to capture all the clustering evolution, especially when the window size is large and the clustering within it evolves a lot.

There are two kinds of windows in streaming: sliding and tumbling windows. Both can be time-based or count based. While the below will focus on a count-based sliding window and a count-based tumbling window, the inventive concept may be applied to time-based sliding and tumbling windows.

A count-based sliding window maintains a specified window size, such as the newest 1 million updates. If a new update comes and the window is full, the oldest update is evicted from the window. A count-based tumbling window stores new updates until it reaches the maximum window size. Once the window is full, all updates are discarded and a new window starts.

In an exemplary embodiment, sampling is applied to the graph updates before they are applied to the window manager 401. The sampling can be used to sparsify the graph.

The graph manager 402 maintains the cluster structures of the current graph and is responsible for answering queries. A common query is whether or not a particular vertex is in the current graph, and if so, to which cluster it belongs. This question comes from users who would like to know about the graph and from the clustering algorithm itself for inserting an edge. Other common queries include (a) "for a given vertex, what are the vertices in the same cluster?" and (b) "what is the total number of clusters?"

Figure 5:
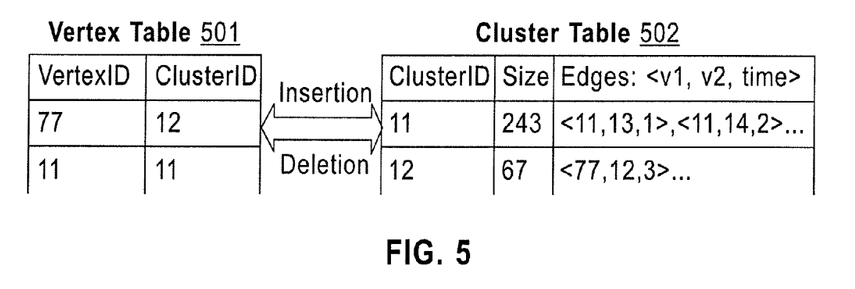
FIG. 5 illustrates exemplary data structures that can be used to manage the clustering of a streaming graph according to an exemplary embodiment of the invention.

FIG. 5 show two data structures that are maintained by the graph manager 402 for the evolution-aware clustering in an exemplary embodiment of the invention. The Vertex Table 501 is a table (e.g., a hash table) used to maintain the mapping of a vertex ID (e.g., uniquely identifies a vertex) to a cluster ID (e.g., uniquely identifies a corresponding cluster). The Cluster Table 502 is another table (e.g., a hash table) used to maintain all the edges in a cluster, consisting of the edges forming a connected component of the current graph within the streaming window. The key or index for the Vertex Table 501 is the vertex ID and the value is the cluster ID. In an exemplary embodiment, the vertex ID of the first vertex in a given cluster is used as the cluster ID of its corresponding cluster. In this way, two different clusters never have the same cluster ID. The key or index for the Cluster Table 502 is the cluster ID and the value is a pair. The first member of the pair is the cluster size, which records the number of vertices in the cluster. The second member of the pair is a list of edges, storing all the connected edges in this cluster. This list is sorted by the edge weights (timestamps). The operations for the list of a single cluster are (i) the addition of an edge to the end (where the weight is biggest/the edge is newest) and (ii) the removal of an edge from the front (where the weight is smallest/the edge is oldest).

This Cluster Table 502 is efficient for edge insertion. The expensive part is deletion, since, after the deletion of an edge, one does not know if the other edges still form a connected component. While an online method can be used to keep track of connected components, it may be complicated to implement and expensive to maintain. Accordingly, in exemplary embodiment of the invention, another method for edge deletion is used as described below.

In an exemplary embodiment, upon a deletion of an edge from a cluster, the entire cluster is deleted and then all the edges are reinserted except for the deleted one. In this way, the insertion routine automatically merges connected components.

For each insertion, the graph manager 402 first queries the Vertex Table 501 and finds the corresponding cluster or creates a new cluster for the vertices. Then, the graph manager 402 goes to the Cluster Table 502, increases the size of the target cluster and appends the edge to the end of cluster edge list. For each deletion, the graph manager 401 erases the entire cluster and reinserts the rest of the edges.

For insertion of an edge, the cluster membership of the two endpoints are first looked up. There are four cases. In case 1, both vertices are new and two new entries are created in the vertex table 501 and the vertex ID of the first vertex is used as the cluster ID. After that, a new entry is created in the cluster table 502 and the new edge is inserted. It is assumed that the maximum cluster size is always great than or equal to 2. In case 2, one of the vertices is new, and one new entry is created in the vertex table 501 and it is assigned the cluster ID of the other vertex. After that, this edge is appended to the corresponding cluster in the cluster table 502. In case 3, both vertices already exist and they are in the same cluster, and the edge is appended to the cluster. In case 4, the vertices exist and are in different clusters, and the smaller cluster is merged to the bigger one so as few entries in the vertex table 501 are modified as possible.

Figure 6:
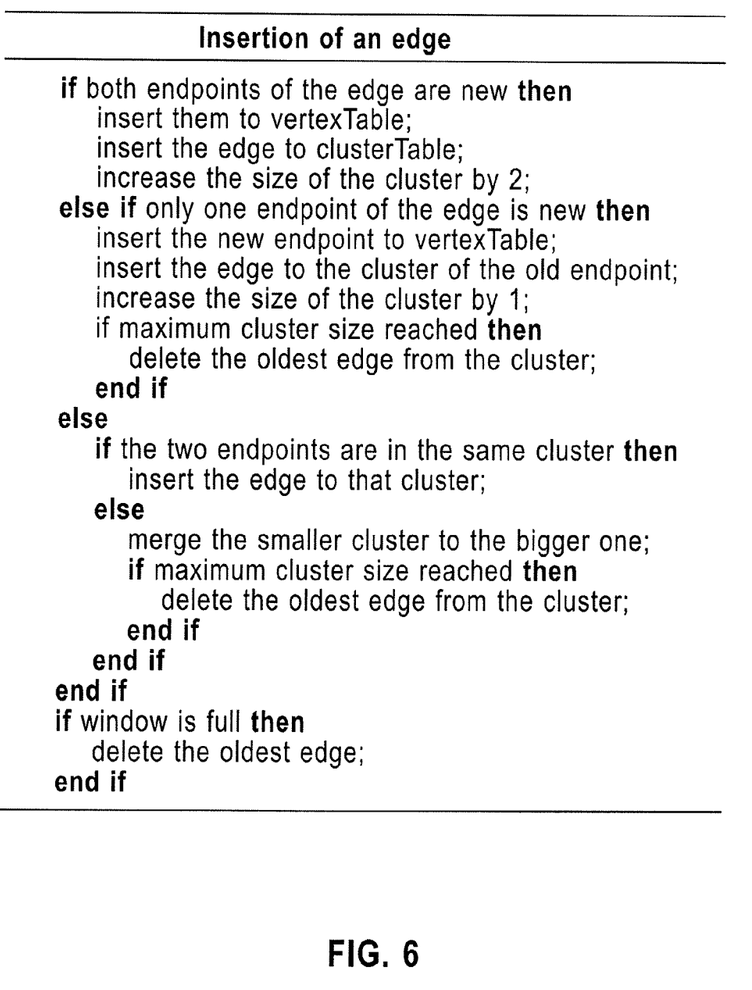
FIG. 6 illustrates exemplary pseudocode for inserting a new edge into a graph according to an exemplary embodiment of the invention.

FIG. 6 shows pseudocode for implementing the insertion according to an exemplary embodiment of the invention. In the pseudocode of FIG. 6, after an edge insertion, it is necessary to check the constraint for the maximum cluster size in Cases 2 and 4. If the constraint is violated, it is necessary to delete the oldest edge from the cluster with the violation. Note that this deletion is conceptually different from the deletion due to the sliding out of a window. In the EAC approach, once an edge is chosen to be deleted because of an MCS constraint violation, it is no longer considered for future clustering decisions. As mentioned before, with each edge weighted by its timestamp, a clustering algorithm can better capture the evolution by minimizing the weighted cut size. By putting more weights on more recent edges and trying to keep new edges rather than the old ones upon an MCS violation, it is more likely to capture the emerging clusters and achieve high-quality clustering.

Figure 7:
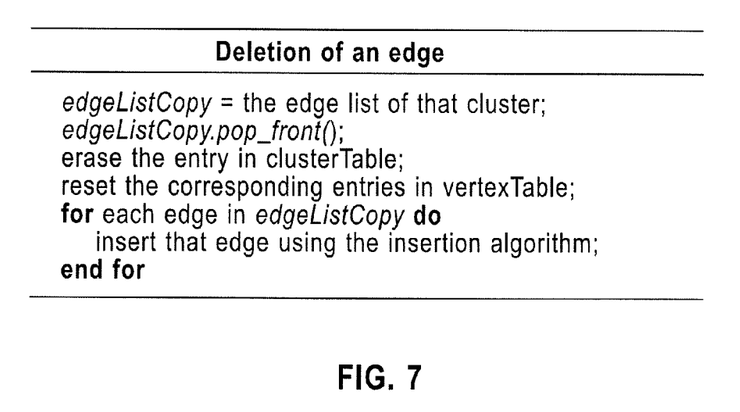
FIG. 7 illustrates exemplary pseudocode for deleting an existing edge of the graph according to an exemplary embodiment of the invention.

FIG. 7 shows pseudocode for implementing the deletion of an edge according to an exemplary embodiment of the invention. The deletion of an edge is used in two situations. The first is when there is a violation of the maximum cluster size. The second is when an edge must be evicted from a window. If the deletion is caused by the violation of the maximum cluster size, the identity of the cluster ID where the edge needs to be deleted is known. If the deletion is due to expiration from a streaming window, the edge is deleted from the cluster table 502 only if the edge still exists. If the edge must be deleted from the cluster table 502, the pseudocode of FIG. 7 can be used. As described earlier, the first element is initially removed (the oldest) from the edge list of the target cluster and the list entry is removed from the cluster table 502. After that, each element is reinserted from the list into the cluster table 502. Note that the reinsertions of the edges from a removed cluster only recluster the edges within that cluster. They will not cause a cascade of constraint violations because none of them will connect to any other clusters that existed before the deletion. The insertion algorithm shown in FIG. 6 automatically merges disconnected clusters. Hence, each deletion caused by an MCS violation is a step towards solving the violation and the algorithms will terminate, even though the algorithms of FIGS. 6 and 7 may call each other multiple times during the process. Although an embodiment of the invention indicates that all affected vertices are erased from the vertex table 501, this is not done in practice. Instead, they are marked with an invalid cluster ID. The reason for doing so is that deleting/inserting an entry in a hash table could be more expensive than just modifying its value, mainly considering that most of the vertices will be reinserted immediately.

Note it is hard to incrementally check the connectivity of the cluster upon an edge deletion. Thus the deletion algorithm of FIG. 7 can be adopted. Alternatively, one can use a breadth first search (BFS) to check the connectivity of the vertices in the related clusters after deletions. But this will require slightly more complicated data structures, since then it is necessary to remember the neighbors of every vertex. An adjacency list or matrix can be used for this purpose depending on density of the graph. However, this modification will not only increase space usage, but also time consumption, since the insertion of an edge will then be more complex. Moreover, if the clusters are disconnected, it will still be necessary to find all affected vertices and split them into two clusters.

Figure 8:
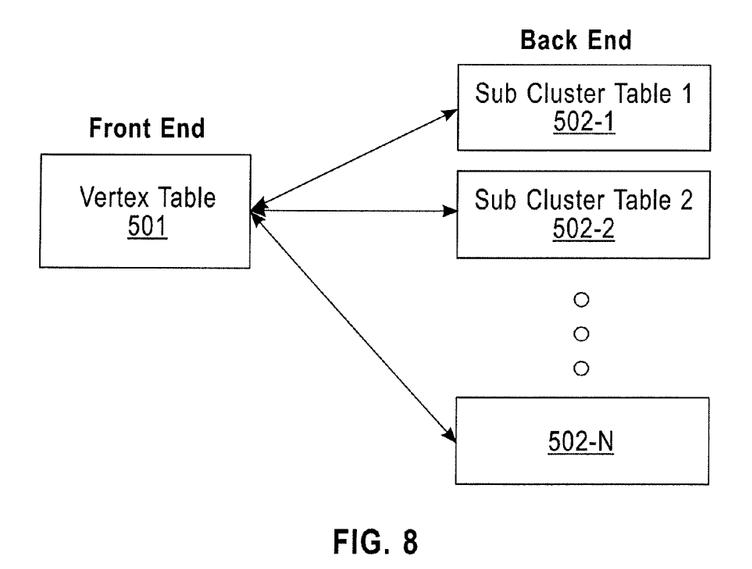
FIG. 8 illustrates a distributed mechanism for managing the clustering of the graph according to an exemplary embodiment of the inventive concept.

FIG. 8 illustrates an example of the distributed machine according to an exemplary embodiment of the invention that includes a front end machine storing the vertex table 501 and one or more back end machines storing the sub cluster tables. When the graph within the current streaming window is still too large to fit in a single machine, we can distribute the storage and computational requirements to different hosts (e.g., the front end and back ends). As the vertex table 501 is much smaller than the cluster table 502, it is assumed that it can fit in a single host (e.g., the front end). As a result, we only need to distribute the cluster table 502 in the several sub cluster tables (e.g., 502-1, 502-2, . . . , 502-n) located on the back end machines. For that, we can do hash partitioning based on the cluster ID. We build another hash table so that we can hash each cluster ID to a machine ID and store the cluster table in that machine. Note for the deletion of an edge, we need to reinsert edges and we can limit all the reinsertion operations to that machine if we use a cluster ID that will be mapped to the same machine during the reinsertions. After the completion of the reinsertions, we need to send the corresponding vertex membership updates to the machine that maintains the vertex table 501. In this way, even if we get more than one cluster from the reinsertions, all the resulting new clusters can still fit in that original machine, because their sum size cannot exceed the size of the original cluster. If two clusters in different hosts need to be merged, we have to move data between the two host machines and send the necessary updates to the machine maintaining the vertex table 501. Finally, if the vertex table 501 is too big to be hosted in one machine, we can also hash the vertex ID to a machine ID so that the vertex table is distributed in a similar way.

At least one embodiment of the invention may be used to discover relationships in social networks such as Facebook™, Twitter™, etc., to make recommendation commerce systems such as Netflix™, Amazon™, etc., sentimental analysis and anomaly detection in a social network such as Twitter™, or cyber security for cloud data centers or corporate networks.

Twitter™ is an online social networking and microblogging service that enables users to send text messages to one or more users. Each one of these messages can be represented as a stream of data. A streaming graph can be used to represent the interconnections among the various users. For example, each user may be represented as a vertex within the graph, and a Tweet™ sent from one user to another user may be represented as an edge of the graph. For example, if a first user represented by a first vertex of the graph Tweets™ to a second user represented by a second vertex of the graph, and the second user responds to the first Tweet™ with a second Tweet™ back to the first user, the graph could include a first outgoing edge connecting the first vertex to the second vertex representing the first Tweet™ and a second outgoing edge connecting the second vertex to the first vertex representing the second Tweet™. The resulting graph could indicate that a relationship exists between the two users (e.g., they are friends), or it could just be noise (e.g., accidental or meaningless tweets), or it could be so old that it becomes unimportant for subsequent use. Thus, the inventive concept could be continuously applied to the multitude of Tweets™ that occur on Twitter™ to continuously determine clusters of interest and leverage from them. For example, if it is determined that users A-D at a given moment are part of a first cluster discussing sports, and users E, F, and G are part of a second cluster discussing cooking, it could be useful to send the first cluster a sport advertisement and the second cluster an advertisement on a cook book, etc. While Twitter™ is used in the above example, the inventive concept is not limited thereto, and can be applied to any system that processes streams of data.

Below, methods for analyzing clustering evolution and quantifying its intensity in a streaming graph are proposed. We can understand the changes in clusters by comparing their structures at two different times. For this comparison, we need two clock times: $t_1$ and $t_2$ and a window size s. Without loss of generality and for ease of analysis, suppose $t_2 > t_1$ and s is the window size (e.g., 24 hours). Let us use the updates arrived between $t_1-s$ and $t_1$ to construct one graph $G[t_1-s, t_1]$ and those in $[t-s, t_2]$ to construct another graph $G[t_2-s, t_2]$. The changes occurring between $t_1$ and $t_2$ can be identified by observing the following: (i) How many new clusters appeared and what they are; (ii) How many clusters disappeared and what they are; 3) How many clusters are still there, what they are and how much their sizes changed. We can leverage EAC to do this kind of analysis. This is because EAC keeps the table for all the clusters in the current graph. More specifically, EAC can output all the clusters and their sizes both on $t_1$ and $t_2$. By comparing the two outputs, we can understand how the evolution happened between $t_1$ and $t_2$. When a large fraction of clusters belong to the third case (the clusters retained from $t_1$ to $t_2$), it is a sign that the stream is stable during this period of time.

By investigating the graph clusters at different times, one can get useful information about how the clusters evolve. In order to understand the general trend in the evolution, however, we need to sample many time slots, which could be a significant extra overhead. Besides, even if all the clusters keep exactly the same from $t_1$ to $t_2$, there still could be evolution. For example, the clusters can change a lot during $[t_1, t_3]$, where $t_3 < t_2$, but finally they all mutate back to the original shapes at $t_2$. This is quite possible when the input streams are periodic. If we do not choose the sampling points carefully, we might overlook the clustering evolution.

In an exemplary embodiment of the invention, an attempt is made to quantity stream stableness. In the embodiment, a method is used to look into the stream of graph updates, as it is the updates themselves that cause the evolution. The changes in clustering results at different points in time are only the effect of the updates, i.e. these phenomena are merely the reaction of the evolving stream updates. Therefore, by monitoring the graph updates, we can better understand and capture the clustering evolution. It is assumed that there is no clustering size constraint and we simply treat a connected component as a cluster. Given a graph and a new edge to be inserted to the graph, this edge is called an unstable edge, if the number of clusters changes after inserting this edge; otherwise, this edge is called a stable edge. A graph is the incremental streaming graph within the current window. Hence the unstableness and stableness of a graph stream is defined by the following equations.

$$\text{unstableness} = \text{Ave}\left(\frac{numUnstableEdgesInWindow}{windowSize}\right) \quad \text{[Equation 2]}$$

$$\text{stableness} = -\log \text{unstableness} \quad \text{[Equation 3]}$$

Unstableness here is measured under a tumbling window. For each time interval (i.e., one tumbling window), we calculate the fraction of unstable edges among all the edges in one window. We obtain unstableness of a stream by computing the average unstableness for different tumbling windows. The higher the unstableness, the more unstable the stream is. It may be easier to visualize the differences in unstableness between two streams if we define a corresponding stableness on a log scale. This is shown in Equation 3. The higher the stableness, the more stable the stream is. Note that unstableness/stableness is measured without the MCS constraint and it is not dependent on any particular clustering algorithm. It simply treats a connected component as a cluster. Thus, unstableness/stableness can be viewed as a natural property of the stream.

Figure 9:
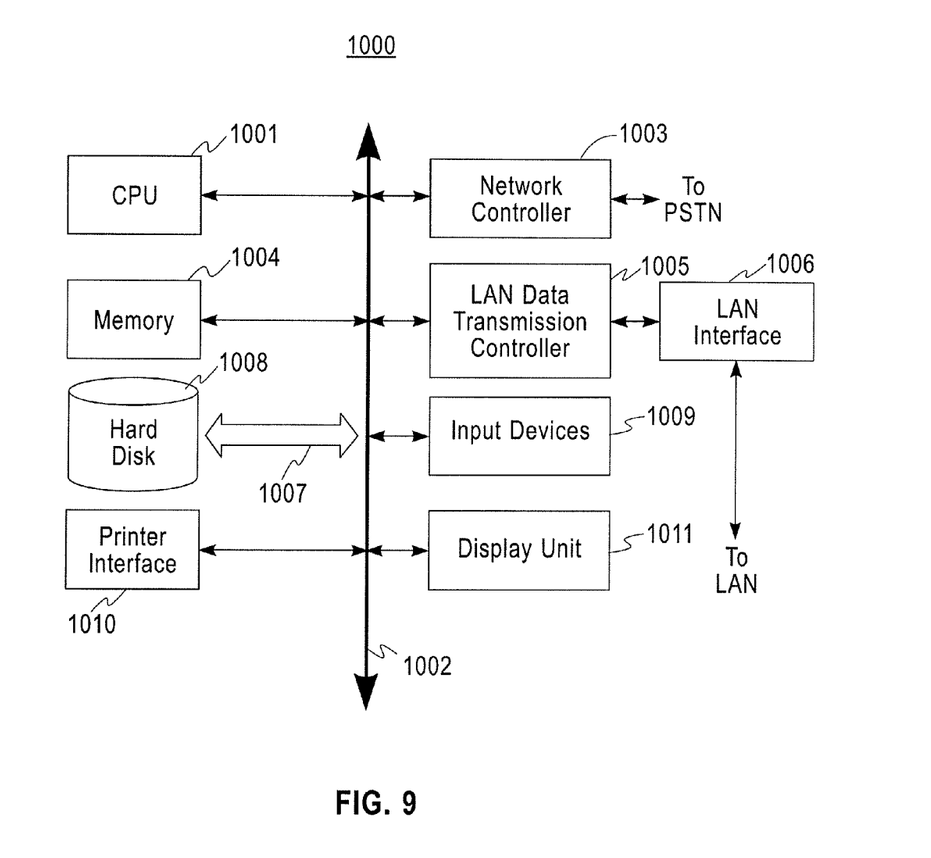
FIG. 9 illustrates an example of a computer system capable of implementing methods and systems according to embodiments of the disclosure.

FIG. 9 illustrates an example of a computer system, which may execute any of the above-described methods, according to exemplary embodiments of the invention. For example, the method of FIG. 2, the managers of FIG. 4, the pseudo-code of FIG. 6 and FIG. 7 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system to manage clustering of a streaming graph for analysis of a social network, the system comprising:

a memory comprising a computer program, a vertex structure storing vertices of the streaming graph, and a cluster structure storing a first cluster and a second cluster of the streaming graph, a cluster size of each of the first and second clusters not exceeding a maximum cluster size, where vertex represents one of a plurality of users on the social network, wherein each cluster structure comprises a plurality of cluster entries and a plurality of edge structures that represent edges of the streaming graph and each edge structure comprises two of the vertices, wherein the edges comprise first connected edges of the first cluster and second connected edges of the second cluster, wherein each edge represents one of a plurality of computer messages exchanged between two of the users; and a processor configured to execute the program to cluster the streaming graph using the structures and the maximum cluster size, wherein the program is configured to receive a new computer message exchanged between a first user and a second user among the users, create a new edge representing the new computer message by connecting a first end of an edge to insert to a first vertex of the first cluster associated with the first user and connecting a second other end of the edge to insert to a second vertex of the second cluster associated with the second user to form a third cluster; continuously delete an oldest edge of the third cluster until it results in a fourth cluster not exceeding the maximum cluster size comprising at least some of the first connected edges and a fifth cluster not exceeding the maximum cluster size comprising at least some of the second connected edges, upon determining a cluster size of the third cluster exceeds the maximum cluster size, wherein one of the fourth and fifth clusters includes the new edge.

2. The system of claim 1, wherein the vertex structure comprises a plurality of vertex entries, and each vertex entry comprises a vertex identifier identifying one of the vertices and a cluster identifier identifying one of the clusters.

3. The system of claim 1, wherein each edge structure comprises a timestamp indicating when the corresponding edge was received.

4. The system of claim 3, wherein the cluster structure comprises a plurality of cluster entries, and each cluster entry comprises a cluster identifier identifying one of the clusters, a size of the one cluster, and at least one of the edge structures of the one cluster.

5. The system of claim 4, wherein the edge structures within each cluster entry are sorted by their respective timestamps.

6. The system of claim 4, wherein the program deletes at least one of the edge structures of one of the cluster entries if the one cluster entry includes a number of vertices exceeding the maximum cluster size.

7. The system of claim 6, wherein the at least one deleted edge structure is selected among the edge structures of the one cluster entry having an oldest timestamp.

8. The system of claim 1, wherein part of the cluster structure is stored in a first computer of the system and a second part of the cluster structure is stored in another second computer of the system, and the computers communicate with one another via a computer network.

9. A method of clustering a streaming graph for analysis of a social network, the streaming graph comprising a first cluster of first connected edges and a second cluster of second connected edges, a cluster size of each of the first and second clusters not exceeding a maximum cluster size, the edges comprise vertexes where each vertex represents one of a plurality of users on the social network, where each edge represents one of a plurality of users on the social network, where each edge represents one of a plurality of computer messages exchanged between two of the users, the method comprising:
 receiving a new computer message exchanged between a first user and a second user among the users;
 creating a new edge representing the new computer message by connecting a first end of an edge to insert to a first vertex of the first cluster associated with the first user and connecting a second other end of the edge to insert to a second vertex of the second cluster associated with the second user to form a third cluster; and
 upon determining a cluster size of the third cluster exceeds the maximum cluster size, continuously deleting an oldest edge of the third cluster until it results in a fourth cluster not exceeding the maximum cluster size comprising at least some of the first connected edges and a fifth cluster not exceeding the maximum cluster size comprising at least some of the second connected edges,
 wherein one of the fourth and fifth clusters includes the new edge.

10. The method of claim 9, wherein each edge has a weight, and the deleting comprises continually deleting a next edge with the least weight until no cluster has a size larger than the maximum cluster size.

11. The method of claim 10, wherein the weight is a timestamp at which the edge was received.

12. The method of claim 9, wherein the deleting comprises referring to a structure comprising the edges ordered according to a time at which each edge is received to select the oldest edges for deletion.

* * * * *